(12) United States Patent
Jeon et al.

(10) Patent No.: US 12,470,439 B2
(45) Date of Patent: Nov. 11, 2025

(54) APPARATUS FOR RECEIVING DATA FROM MEMORY

(71) Applicant: Electronics and Telecommunications Research Institute, Daejeon (KR)

(72) Inventors: Young-deuk Jeon, Sejong-si (KR); Young-Su Kwon, Daejeon (KR); Yi-Gyeong Kim, Daejeon (KR); Su-Jin Park, Daejeon (KR); Min-Hyung Cho, Daejeon (KR); Jae-Woong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 75 days.

(21) Appl. No.: 18/506,544

(22) Filed: Nov. 10, 2023

(65) Prior Publication Data
US 2024/0163139 A1 May 16, 2024

(30) Foreign Application Priority Data

Nov. 11, 2022 (KR) .................. 10-2022-0150545
Oct. 25, 2023 (KR) .................. 10-2023-0143681

(51) Int. Cl.
*H04L 25/03* (2006.01)
*G06F 13/16* (2006.01)
*H04L 25/02* (2006.01)

(52) U.S. Cl.
CPC ........ *H04L 25/03057* (2013.01); *G06F 13/16* (2013.01); *H04L 25/0272* (2013.01); *G06F 2213/16* (2013.01)

(58) Field of Classification Search
CPC ........... H04L 25/03057; H04L 25/0272; G06F 13/16; G06F 2113/16
(Continued)

(56) References Cited

U.S. PATENT DOCUMENTS 10,672,438 B2   6/2020  Mostofa et al.
11,349,445 B2   5/2022  Duan et al.
(Continued)

FOREIGN PATENT DOCUMENTS

KR   10-2020-0067215 A    6/2020
KR   10-2021-0053813 A    5/2021
KR   10-2022-0145915 A   10/2022

OTHER PUBLICATIONS

Seuk Son et al., "A 2.3-mW, 5-GB/s Low-Power Decision-Feedback Equalizer Receiver Front-End and its Two-Step, Minimum Bit-Error-Rate Adaptation Algorithm", IEEE Journal of Solid-State Circuits, Nov. 2013, pp. 2693-2704, vol. 48, No. 11.

*Primary Examiner* — Leila Malek
(74) *Attorney, Agent, or Firm* — Sughrue Mion, PLLC

(57) ABSTRACT

Disclosed herein is an apparatus for receiving data from memory. The apparatus receives a data signal and a clock signal output from memory and includes a Decision Feedback Equalizer (DFE) including two or more differential signal path units configured to determine and output an output value corresponding to the data signal. Each of the two or more differential signal path units may determine a current output value by reflecting a previous output value fed back from a different one of the two or more differential signal path units in such a way that they operate at different clocks, and may include an offset control unit configured to adjust an offset at an input stage and a feedback control unit configured to change a load of an output stage using the previous output value fed back from the different one of the two or more differential signal path units.

14 Claims, 14 Drawing Sheets

(58) Field of Classification Search
USPC ........................................................ 375/233
See application file for complete search history.

(56) References Cited

U.S. PATENT DOCUMENTS

| | | |
|---|---|---|
| 2019/0280907 A1 | 9/2019 | Sreeramaneni et al. |
| 2020/0252244 A1 | 8/2020 | Taylor et al. |
| 2023/0023730 A1* | 1/2023 | Lin ...................... G11C 7/1087 |

* cited by examiner

APPARATUS FOR RECEIVING DATA FROM MEMORY

CROSS REFERENCE TO RELATED APPLICATIONS

This application claims the benefit of Korean Patent Applications No. 10-2022-0150545, filed Nov. 11, 2022, and No. 10-2023-0143681, filed Oct. 25, 2023, which are hereby incorporated by reference in their entireties into this application.

BACKGROUND OF THE INVENTION

1. Technical Field

The disclosed embodiment relates to technology for an interface for receiving data read from memory.

2. Description of the Related Art

Unlike existing systems that connect a System-on-Chip (SoC) and a memory chip, High-Bandwidth Memory (HBM) uses 1024μ-bumps and connects an SoC with the HBM through a fine pattern using an interposer, rather than a Printed Circuit Board (PCB), in order to secure high-capacity memory bandwidth.

For 1024 data lines, transmission/reception (TX/RX) interfaces for HBM are required. In particular, the HBM3 standard requires 1024 I/Os that have a maximum speed of 6.4 Gbps and process signals at the level of a minimum signal size of 140 mV.

In order to handle high-speed signals smaller than a threshold of a transistor, a receiving circuit with equalizer functionality must be built in a limited area.

However, existing receiving circuits have limitations in reducing the area because they use equalizers having multiple input stages in which offset and Decision Feedback Equalizer (DFE) functionalities are included. That is, the existing DFE circuits capable of correcting an offset have multiple input stages in order to control the DFE and the offset, which results in an increase in the area of the receiving circuit chip.

SUMMARY OF THE INVENTION

An object of the disclosed embodiment is to minimize an area while maintaining performance in an interface for receiving data from memory.

Another object of the disclosed embodiment is to minimize power consumption for driving a circuit in a data receiving interface of memory and to improve data transfer efficiency.

An apparatus for receiving data from memory according to an embodiment is configured to receive a data signal and a clock signal output from the memory, and may include a Decision Feedback Equalizer (DFE) formed of two or more differential signal path units configured to determine and output an output value corresponding to the data signal. Each of the two or more differential signal path units may determine a current output value by reflecting a previous output value fed back from a different one of the two or more differential signal path units in such a way that the two or more differential signal path units operate at different clocks, and may include an offset control unit configured to adjust an offset at an input stage and a feedback control unit configured to adjust a load of an output stage using the previous output value fed back from the different one of the two or more differential signal path units.

Here, each of the two or more differential signal path units may include a summer configured to amplify the difference between the data signal and a reference voltage based on the previous output value fed back from the different one of the two or more differential signal path units and a latch configured to set an output value to '1' or '0' based on the difference between the data signal and the reference signal, which is output from the summer, and to output the output value.

Here, each of the two or more differential signal path units may further include an SR latch configured to hold a signal output from the latch.

Here, the summer may include a first transistor configured to receive the data signal, a second transistor configured to receive the reference voltage, a first offset control unit connected to the first transistor and configured to adjust a voltage of the first transistor depending on an applied offset control signal, and a second offset control unit connected to the second transistor and configured to adjust a voltage of the second transistor depending on an applied offset control signal.

Here, each of the first offset control unit and the second offset control unit may be configured with a transistor array.

Here, the first offset control unit may include a third transistor configured to receive the data signal and a fourth transistor connected in series to the third transistor and configured to receive the offset control signal, and at least one of a pair of the third transistor and the fourth transistor may be connected in parallel to the first transistor.

Here, the second offset control unit may include a fifth transistor configured to receive the reference voltage and a sixth transistor connected in series to the fifth transistor and configured to receive the offset control signal from outside, and at least one of a pair of the fifth transistor and the sixth transistor may be connected in parallel to the second transistor.

Here, the summer may further include a feedback control unit that is used as the load of the output stage and changed by the previous output value fed back from the different one of the two or more differential signal path units.

Here, the feedback control unit may be configured with multiple transistors, and part of the multiple transistors may be selectively turned on depending on an applied DFE control signal, thereby adjusting a magnitude fed back from the previous output value fed back from the different one of the two or more signal path units.

A summer according to an embodiment may amplify and output the difference between a data signal and a reference voltage input thereto, and may include an offset control unit configured to adjust an offset at an input stage and a feedback control unit configured to change a load of an output stage using a digital decision output value corresponding to a previous data signal that is fed back.

Here, the input stage may include a first transistor configured to receive a clock signal, a second transistor configured to receive the data signal, and a third transistor configured to receive the reference voltage.

Here, the offset control unit may include a first offset control unit connected to the second transistor and configured to adjust a voltage of the second transistor depending on an applied offset control signal and a second offset control unit connected to the third transistor and configured to adjust a voltage of the third transistor depending on an applied offset control signal.

Here, each of the first offset control unit and the second offset control unit may be configured with a transistor array.

Here, the first offset control unit may include a fourth transistor configured to receive the data signal and a fifth transistor connected in series to the fourth transistor and configured to receive the offset control signal, and at least one of a pair of the fourth transistor and the fifth transistor may be connected in parallel to the second transistor.

Here, the second offset control unit may include a sixth transistor configured to receive the reference voltage and a seventh transistor connected in series to the sixth transistor and configured to receive the offset control signal from outside, and at least one of a pair of the sixth transistor and the seventh transistor may be connected in parallel to the third transistor.

Here, the feedback control unit may be configured with multiple transistors, and part of the multiple transistors may be selectively turned on depending on an applied DFE control signal, thereby adjusting the magnitude of the previous data signal that is fed back.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
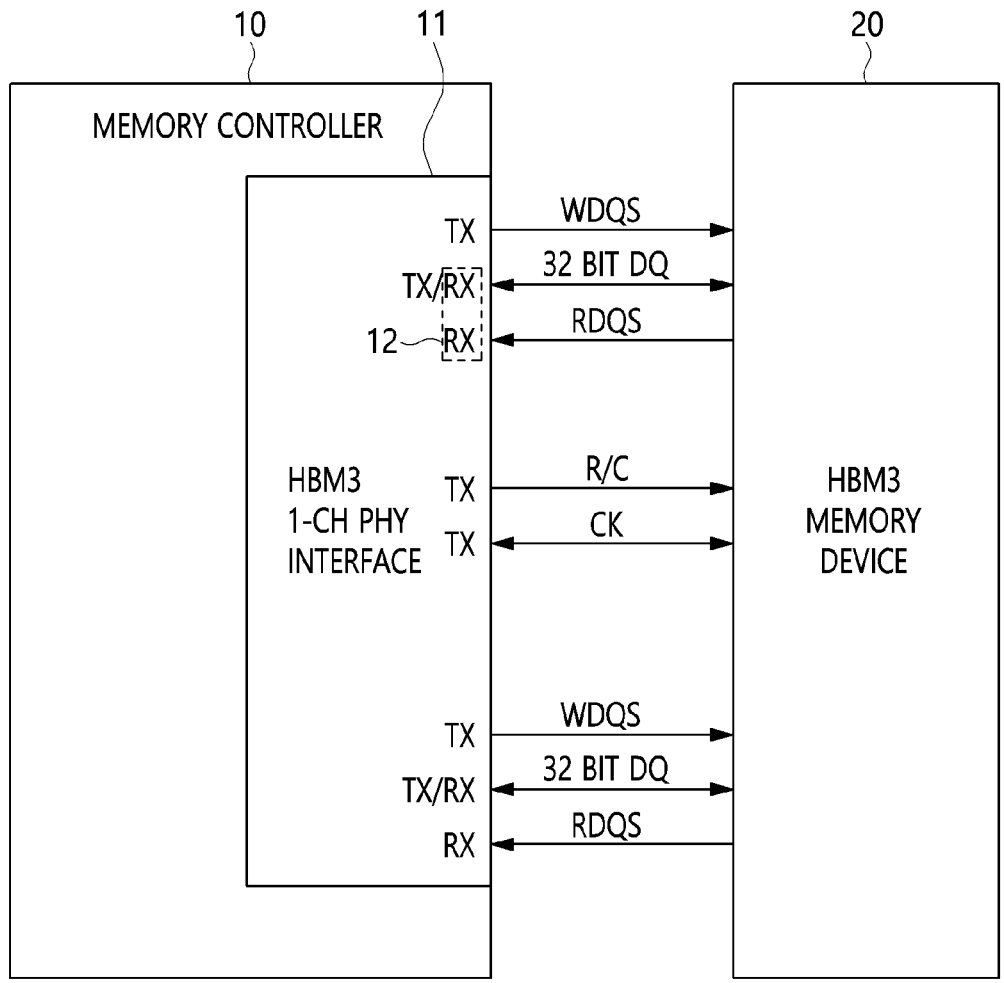
FIG. 1 is a schematic block diagram of a memory system to which an embodiment is applied.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

FIG. 1 is a schematic block diagram of a memory system to which an embodiment is applied.

Referring to FIG. 1, the memory system may be configured with a memory controller 10 and a memory device 20.

Here, the memory controller 10 may include a PHY interface 11 for writing or reading data to or from the memory device 20.

In order to write or read data, the PHY interface 11 may output a command R/C for specifying a memory address along with a clock signal CK and apply the same to the memory device 20. Here, the command R/C may be a signal for specifying a row and a column of a memory array.

The PHY interface 11 and the memory device 20 may transmit and receive data bidirectionally through a 32-bit data line DQ therebetween.

Here, when data is written to the memory device 20, the PHY interface 11 outputs the data and WDQS, which is a write clock signal, to the memory device 20 at the same time.

Conversely, when data is read from the memory device 20, the PHY interface 11 receives the data and RDQS, which is a read clock signal, from the memory device 20 at the same time.

Meanwhile, the HBM3 memory device 20 is configured with 16 channels, and each of the channels has 64 DQ lines, as illustrated in FIG. 1. Therefore, in order to transmit and receive data, a total of 1024 I/O interfaces for data transmission/reception is required.

In order to support such a large number of DQ connections, an SoC and the HBM memory are connected by being arranged on an interposer in which they can be connected with a width of several hundred nm to several m.

Therefore, μ-bumps having a size of several tens of m are used as the bumps connected to the respective I/O interfaces, and the bump pitch is also 48 μm, which is equal to or less than ⅓~½ of the pitch of a general bump.

Because the bump pitch is narrow and 1024 I/Os are required, as described above, the PHY interface circuit 11 has to be implemented in a small area.

As described above, the PHY interface 11 may include a transmitting end TX for transmitting data and WDQS, which is a write clock signal, to the memory device 20 and a receiving end RX 12 (referred to as an 'apparatus for receiving data from memory' hereinbelow) for receiving data and RDQS, which is a read clock signal, from the memory device 20.

Figure 2:
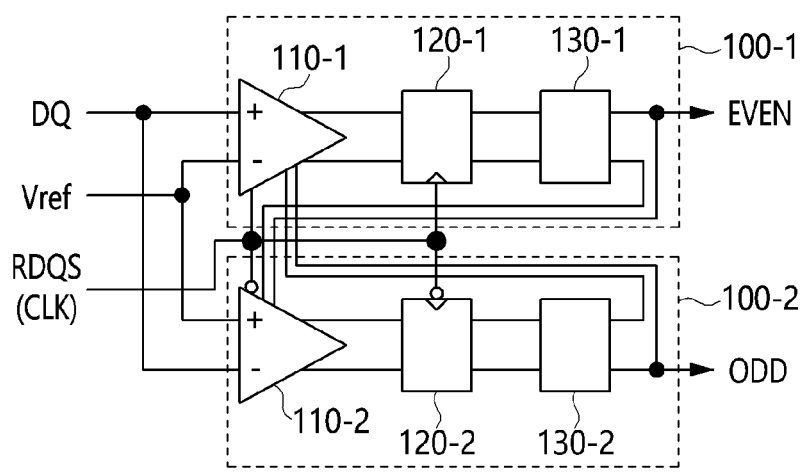
FIG. 2 is a circuit diagram of an apparatus for receiving data from memory according to an embodiment.
Figure 3:
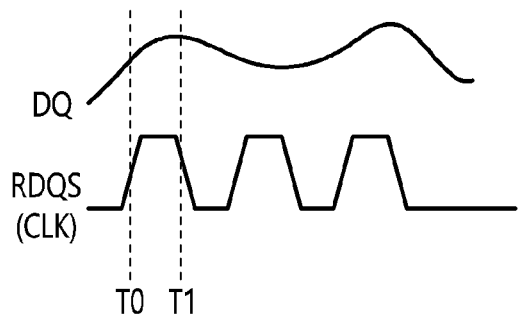
FIG. 3 is an exemplary view of a data signal and a clock signal that are input to an apparatus for receiving data from memory according to an embodiment.

FIG. 2 is a circuit diagram of an apparatus for receiving data from memory according to an embodiment, and FIG. 3 is an exemplary view of a data signal DQ and a clock signal CLK input to the apparatus for receiving data from memory according to an embodiment.

Referring to FIG. 2, the apparatus for receiving data from memory according to an embodiment receives a data signal DQ and a clock signal CLK output from memory, and may include a Decision Feedback Equalizer (DFE) formed of two or more differential signal path units 100-1 and 100-2 configured to determine an output value (EVEN/ODD) corresponding to the data signal DQ and to output the same.

That is, each of the two or more differential signal path units 100-1 and 100-2 may determine whether the data signal DQ received from the memory device 20 is '0 (Low)' or '1 (High)' and output '0 (Low)' or '1 (High)'.

Because the data signal DQ received from the memory device 20 is not a digital signal such as '0' or '1' but an analog signal, as illustrated in FIG. 3, a digitized result value of the data signal DQ input as an analog signal is determined based on the difference from a reference voltage Vref. For example, when the data signal DQ is higher than the reference voltage Vref, '1' may be output, whereas when the data signal DQ is lower than the reference voltage Vref, '0' may be output.

Here, each of the two or more differential signal path units 100-1 and 100-2 may operate by RDQS (referred to as 'CLK' hereinbelow), which is a clock signal received from the memory device 20, and they may operate at different clocks.

That is, the differential signal path unit 100-1 may operate at the rising edge of the clock, and the differential signal path unit 100-2 may operate at the falling edge of the clock, whereby they alternately operate.

Accordingly, each of the two or more differential signal path units 100-1 and 100-2 may easily determine a current output value by reflecting a previous output value fed back from a different one of the two or more differential signal path units 100-1 and 100-2. That is, the differential signal path unit 100-2 may determine the output value Dout_1 for the data signal DQ input at T1 based on the output value Dout_0 that is determined by the differential signal path unit 100-1 for the data signal DQ input at T0, as illustrated in FIG. 3.

Here, each of the two or more differential signal path units 100-1 and 100-2 may include a summer 110-1 or 110-2 and a latch 120-1 or 120-2.

Here, the summer 110-1 or 110-2 may amplify the difference between the data signal DQ and the reference voltage Vref based on the previous output value fed back from the different differential signal path unit 100-2 or 100-1 and output the same.

Here, each of the summers 110-1 and 110-2 may be designed as a circuit structure using an amplifier, but a summer operating based on a clock may be used. Accordingly, power consumption for the operation of the summers 110-1 and 110-2 may be reduced.

The latches 120-1 and 120-2 may determine an output value '1' or '0' based on the voltage difference output from the summers 110-1 and 110-2 and output the same.

Also, each of the differential signal path units 100-1 and 100-2 may further include an SR latch 130-1 or 130-2 for holding the signal output from the latch 120-1 or 120-2. The SR latches are for storing the values output from the latches 120-1 and 120-2 that are driven only when a clock signal is input thereto. Accordingly, the previous output value stored in the SR latch 130-1 or 130-2 may be fed back and used when the different differential signal path unit 100-2 or 100-1 is driven.

Meanwhile, the two differential signal path units 100-1 and 100-2 are illustrated in FIG. 2, but the present disclosure is not limited thereto. That is, the number of differential signal path units and components therein may be variously configured depending on the structure of the Decision Feedback Equalizer (DFE) 100 and the number of DFE taps.

Figure 4:
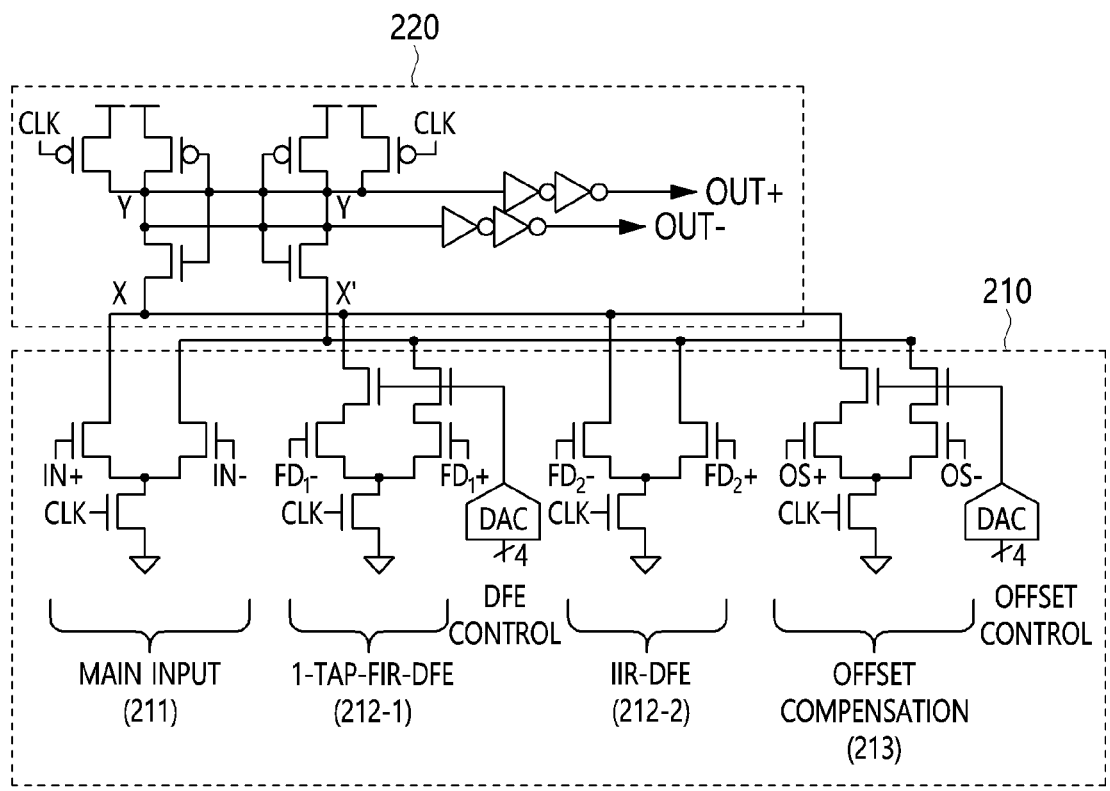
FIG. 4 is a circuit diagram illustrating an example of a general differential signal path unit.

FIG. 4 is a circuit diagram illustrating an example of a general differential signal path unit.

Referring to FIG. 4, a summer 210 included in a general differential signal path unit may include a main input stage 211 to which a data signal DQ (IN+) and a reference voltage Vref (IN−) are applied, DFE input stages 212-1 and 212-2 to which a previous output value FD fed back from another differential signal path unit is applied, and an offset compensation unit 213 for adjusting the offset between X and X' of the output stage of the summer 210.

Here, the main input stage 211 is configured with at least three transistors in order to respectively receive the data signal DQ (IN+), the reference voltage Vref (IN−), and a clock signal CLK.

Each of the DFE input stages 212-1 and 212-2 is also configured with at least three transistors in order to respectively receive the feedback signals FD− and FD+ and a clock signal CLK, and the offset compensation unit 213 is also configured with at least three transistors in order to respectively receive offset signals OS− and OS+ and a clock signal CLK.

That is, because the circuit of the summer 210 included in the general differential signal path unit is configured with multiple input stages, including the main input stage 211, the DFE input stages 212-1 and 212-2, and the offset compensation unit 213, it is not easy to reduce the area when a chip is implemented.

Furthermore, the DFE input stages 212-1 and 212-2 and the offset compensation unit 213 include respective Digital-to-Analog Converters (DAC), as illustrated in FIG. 4, whereby the magnitudes of a DFE control signal and an offset control signal that are input thereto are adjusted.

Here, because the Digital-to-Analog Converter (DAC) used for each of the DFE input stages 212-1 and 212-2 and the offset compensation unit 213 is configured with a very complicated circuit, it further increases the area of the circuit of the summer 210 and complicates the circuit. Accordingly, the size of the chip is increased, and power consumption is also greatly increased for high-speed signal processing of the complicated circuit having a large area.

In order to solve the above-described problem with the conventional technology, a Decision Feedback Equalizer (DFE) 100 according to an embodiment of the present disclosure is configured with a single input stage and a single output stage and includes an offset control function and a DFE control function in the input stage and the output stage, respectively, thereby facilitating reduction of the area of the chip.

Figure 5:
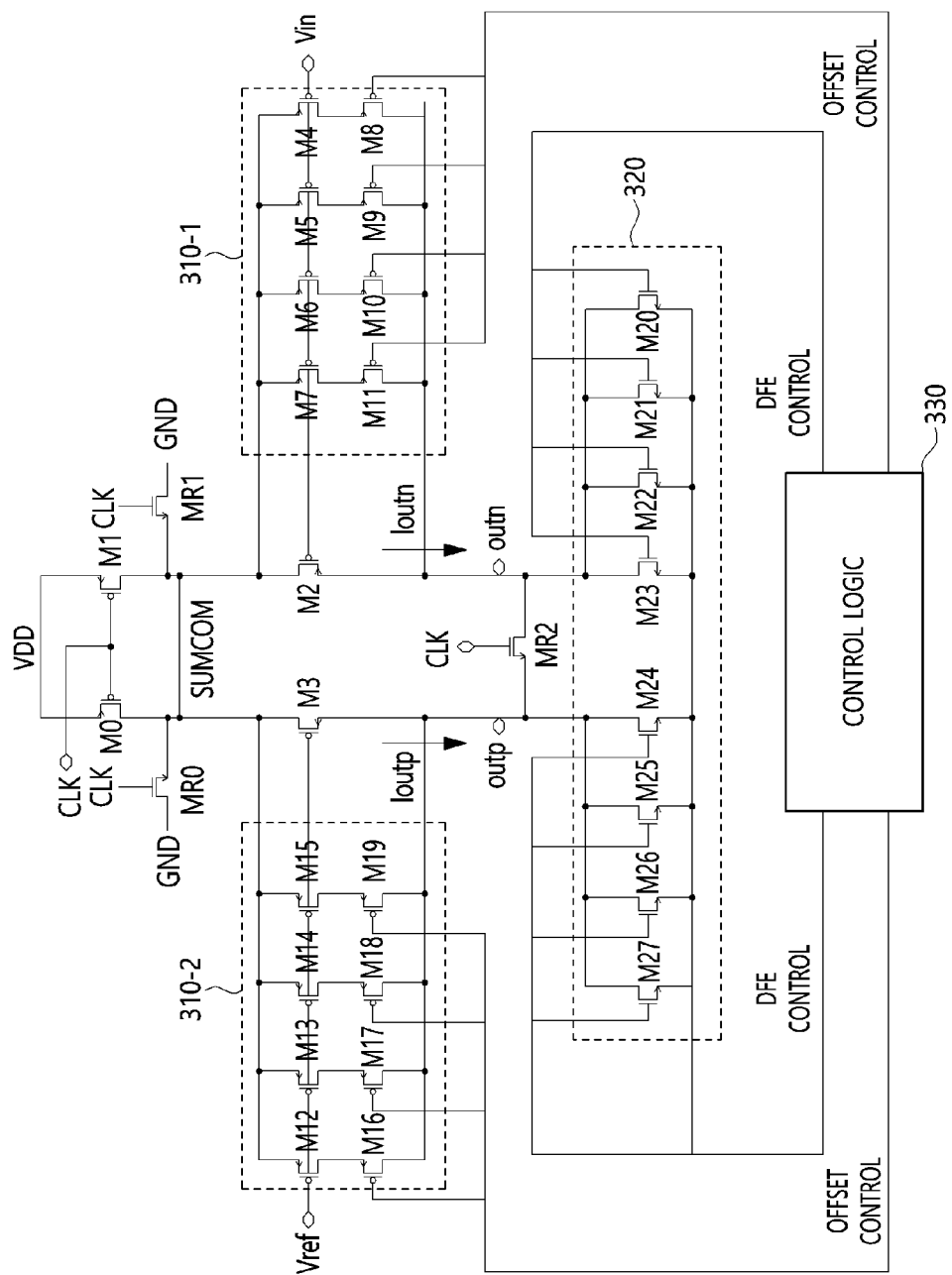
FIG. 5 is an example of a circuit diagram of a summer according to an embodiment.
Figure 6:
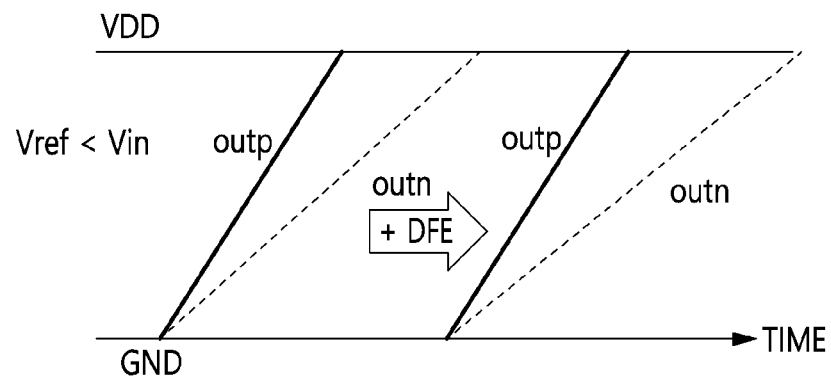
FIG. 6 and FIG. 7 are exemplary views of a graph of a voltage change over time at nodes outp and outn of an output stage of a summer.
Figure 7:
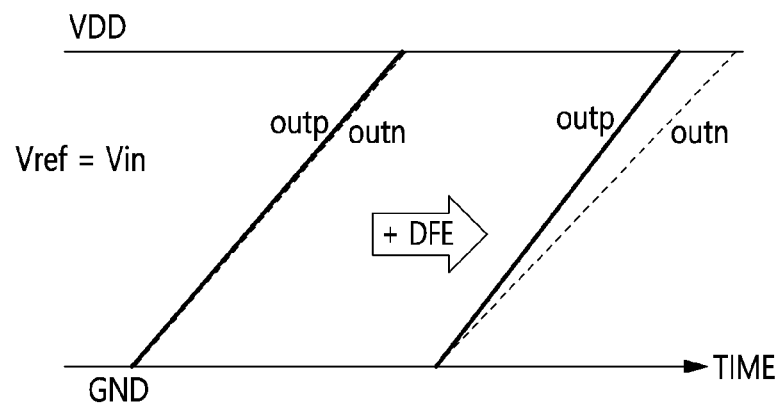

FIG. 5 is an example of a circuit diagram of a summer according to an embodiment, and FIG. 6 and FIG. 7 are exemplary views of a graph of a voltage change over time at nodes outp and outn of the output stage of the summer.

Referring to FIG. 5, the summers 110-1 and 110-2 according to an embodiment may be configured such that the input stage thereof includes transistors M0 and M1 for receiving a clock signal CLK, a transistor M2 for receiving a data signal Vin, and a transistor M3 for receiving a reference voltage Vref.

Here, the transistors M0 to M3 may be configured with P-channel Metal-Oxide-Semiconductor Field-Effect Transistors (MOSFETs), as illustrated in FIG. 5, but the present disclosure is not limited thereto. That is, other various types of transistors may be used.

Also, the summers 110-1 and 110-2 may further include transistors MR0, MR1, and MR2 that are used as reset switches in response to input of a clock signal CLK.

Here, the clock signal CLK input to the transistor MR2 located between the output stage nodes outp and outn may be delayed and input later than the clock signal input to the transistors MR0 and MR1.

Here, the transistors MR0, MR1, and MR2 may be configured with N-channel MOSFETs, as illustrated in FIG. 5, but the present disclosure is not limited thereto. That is, other various types of transistors may be used.

Here, according to an embodiment, the summers 110-1 and 110-2 may further include offset control units 310-1 and 310-2 for adjusting the magnitudes of the voltages of the transistors M2 and M3 corresponding to the input stage. That is, the offset control function is implemented in the main input stage.

That is, the first offset control unit 310-1 is connected to the transistor M2 to which the data signal Vin is input, thereby adjusting the voltage of the transistor M2 depending on the applied offset control signal.

The second offset control unit 310-2 is connected to the transistor M3 to which the reference voltage Vref is input, thereby adjusting the voltage of the transistor M3 depending on the applied offset control signal.

The Decision Feedback Equalizer (DFE) 100 according to an embodiment may further include control logic 300 for outputting at least one of an offset control signal, or a DFE control signal, or a combination thereof.

The control logic 330 may be configured with various logic circuits including components such as an inverter and a NAND gate. Here, unlike that illustrated in FIG. 5, an offset control signal and a DFE control signal may be respectively generated by separate control logic units.

Here, each of the first offset control unit 310-1 and the second offset control unit 310-2 may be a transistor array. Here, the transistor array may have W/L different from that of the input stage configured with the transistors M2 to M3.

According to an embodiment, the first offset control unit 310-1 may include transistors M4 to M7 configured to receive the data signal Vin and transistors M8 to M11 respectively connected in series to the transistors M4 to M7 and configured to receive the offset control signal.

Here, at least one of pairs of the transistors M4 to M7 and the transistors M8 to M11 may be connected in parallel to the transistor M2, as illustrated in FIG. 5.

That is, the transistors M4 to M7 configured to receive the data signal Vin are selectively turned on or off depending on the offset control signal for turning on or off the transistors M8 to M11, whereby the size of the transistor M2 may be adjusted. For example, the size of the transistor M2 may be adjusted depending on the number of transistors selected to be turned on among the transistors M4 to M7.

Also, according to an embodiment, the second offset control unit 310-2 may include transistors M12 to M15 configured to receive the reference voltage Vref and transistors M16 to M19 respectively connected in series to the transistors M12 to M15 and configured to receive the offset control signal.

Here, at least one of pairs of the transistors M12 to M15 and the transistors M16 to M19 may be connected in parallel to the transistor M3, as illustrated in FIG. 5.

That is, the transistors M12 to M15 configured to receive the reference voltage Vref are selectively turned on or off depending on the offset control signal for turning on or off the transistors M16 to M19, which are respectively connected in series to the transistors M12 to M15, whereby the size of the transistor M3 may be adjusted. For example, the size of the transistor M3 may be adjusted depending on the number of transistors selected to be turned on among the transistors M12 to M15.

Here, the transistors M4 to M19 may be configured with P-channel MOSFETs, as illustrated in FIG. 5. However, this is an example, and the present disclosure is not limited thereto. That is, other various types of transistors may be used to function as the offset control units 310-1 and 310-2, and the number of transistors and the connection structure thereof may be variously set and designed.

Also, according to an embodiment, each of the summers 110-1 and 110-2 may further include a feedback control unit 320 that is used as the load of the output stage (outp and outn) and changed by a previous output value fed back from another differential signal path unit.

Here, the feedback control unit 320 may be configured with a transistor array. Here, the transistor array may have W/L different from that of the input stage configured with the transistors M2 to M3.

The feedback control unit 320 is configured with multiple transistors M20 to M27, and a predetermined number of transistors, among the multiple transistors M20 to M27, are selectively turned on depending on a DFE control signal applied thereto, whereby the previous output value fed back from the different differential signal path unit, that is, the magnitude of the DFE signal, may be adjusted.

That is, the DFE signal that is fed back selectively turns on the multiple transistors M20 to M27 through the control logic 300 so as not only to adjust the magnitude of the DFE signal but also to change the load condition when the summer operates, whereby the DFE function may be implemented.

Here, the transistors M20 and M27 may be configured with N-channel MOSFETs, as illustrated in FIG. 5, but the present disclosure is not limited thereto. That is, other various types of transistors may be used to function as the feedback control unit 320, and the number of transistors and the connection structure thereof may be variously set and designed.

As described above, because each of the summers 110-1 and 110-2 included in the Decision Feedback Equalizer (DFE) 100 according to an embodiment is configured with a single input stage and a single output stage, the circuit is simplified, whereby when a chip is implemented, the area may be reduced. Accordingly, power consumption may be reduced when a data signal is transmitted to and received from the memory device 20 at high speeds.

The operation of the summers 110-1 and 110-2 illustrated in FIG. 5 will be described in detail below.

When a clock signal of '1 (high)' is applied, the P-channel transistors M0 and M1 receiving the clock signal of '1' at the gates thereof are turned off, and the N-channel transistors MR0 to MR2 are turned on. Accordingly, the output stage nodes outp and outn and a sumcom node are grounded and reset.

When the clock signal CLK changes from '1 (high)' to '0 (low)' in the state in which the nodes are reset, the P-channel transistors M0 and M1 are turned on and the N-channel transistors MR0 to MR2 are turned off.

In this state, when the data signal Vin and the reference voltage Vref are capable of respectively turning on the P-channel transistors M2 and M3, current flows in the transistors M2 and M3 depending on the voltage VDD applied to the sources of the P-channel transistors M0 and M1, and the voltages of the output stage nodes outp and outn gradually increase from GND to VDD over time.

Here, the rising slopes of the voltage values of the output stage nodes outp and outn over time may be respectively determined depending on the voltage levels of the data signal Vin and the reference voltage Vref. That is, the greater the voltage difference between the data signal Vin and the reference voltage Vref, the greater the difference between the rising slopes of the voltage values of the output stage nodes outp and outn over time, but the less the voltage difference between the data signal Vin and the reference voltage Vref, the less the difference between the rising slopes of the voltage values of the output stage nodes outp and outn over time.

For example, when Vref<Vin is satisfied, as illustrated in FIG. 6, because the input stage is configured with P-channel transistors, the magnitude of current Ioutp flowing in the transistor M3 to which the reference voltage Vref is input is greater than the magnitude of current Ioutn flowing in the transistor M2 to which the data signal Vin is input. Accordingly, the rising slope of the voltage of the output stage node outp is greater than the rising slope of the voltage of the output stage node outn, and the voltage of outp reaches VDD earlier than the voltage of outn.

In another example, when Vref=Vin is satisfied, as illustrated in FIG. 7, the rising slopes of the voltages at the output stage nodes outp and outn are almost the same.

Meanwhile, when the data signal Vin is equal to the reference voltage Vref, the output stage nodes outp and outn should have the same voltage value. However, an error occurring due to various causes may result in an offset between the voltage values at the output stage nodes outp and outn. In this case, it is necessary to compensate the output signals of the output stage nodes outp and outn for the offset.

According to an embodiment, when the data signal Vin is equal to the reference voltage Vref, if there is a difference between the voltage values of the output stage nodes outp and outn, the control logic 330 determines an offset that needs to be compensated for. Here, the offset may be determined at predetermined periods.

Subsequently, the control logic 330 inputs a control signal for selectively turning on or off the transistors M8 to M11 of the first offset control unit 310-1 and the transistors M16 to M19 of the second offset control unit 310-2 so as to compensate for the determined offset. Accordingly, the transistors M4 to M7 connected in series to the transistors M8 to M11 or the transistors M12 to M15 connected in series to the transistors M16 to M19 are also selectively turned on or off, whereby the magnitudes of the voltages of the transistors M2 and M3 may be adjusted.

For example, when the data input signal Vin is equal to the reference voltage Vref, if the voltage of the output stage node outp is higher than the voltage of the output stage node outn, the control logic 330 selects a greater number of transistors to be turned on among the transistors M4 to M7 than the transistors that are selected to be turned on among the transistors M12 to M15, thereby compensating for the offset.

FIGS. 8 to 12 are exemplary views of waveforms in a simulation in which a general summer is applied to a differential signal path unit.

Figure 8:
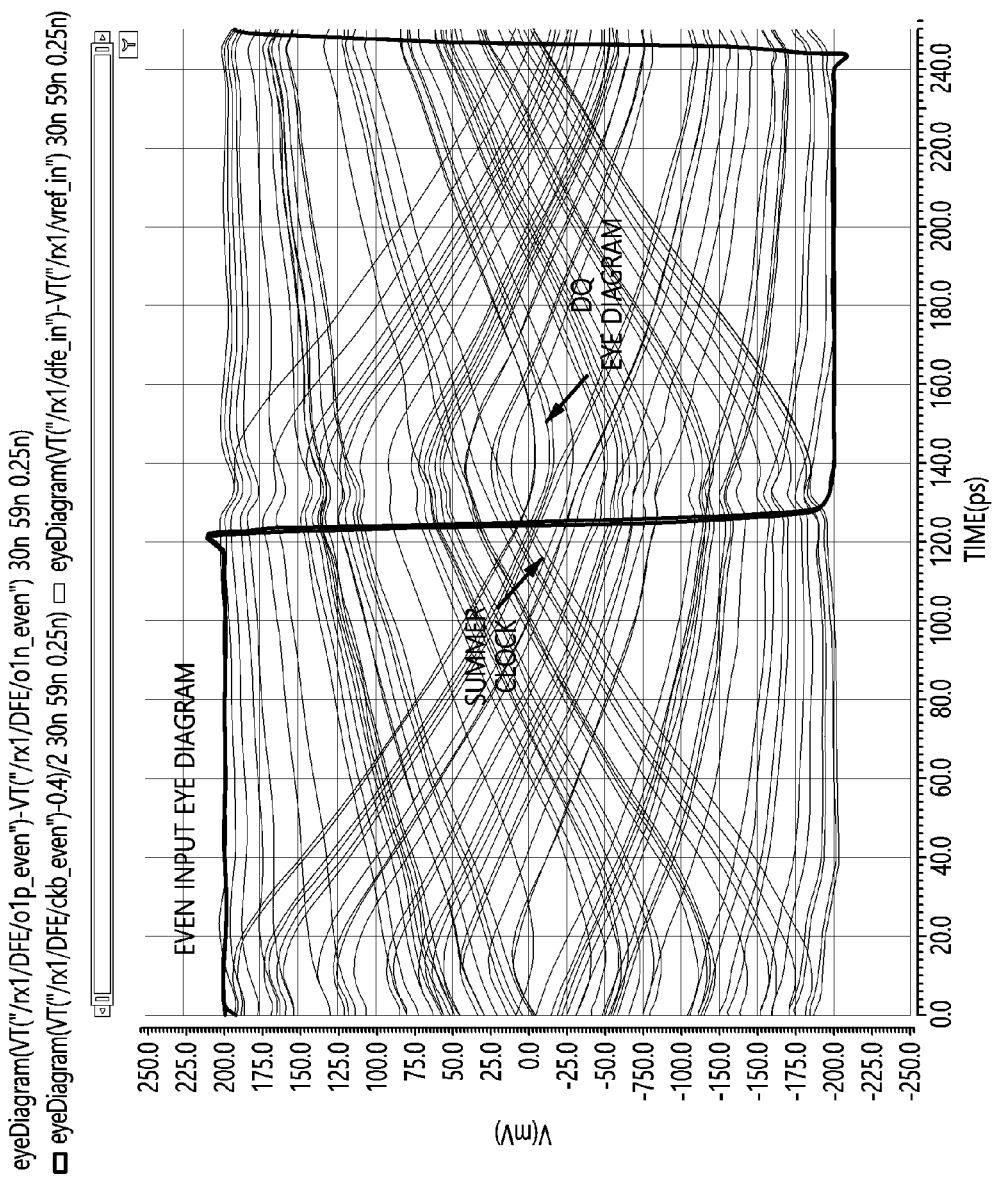
FIGS. 8 to 12 are exemplary views of waveforms in a simulation in which a general summer is applied to a differential signal path unit.
Figure 9:
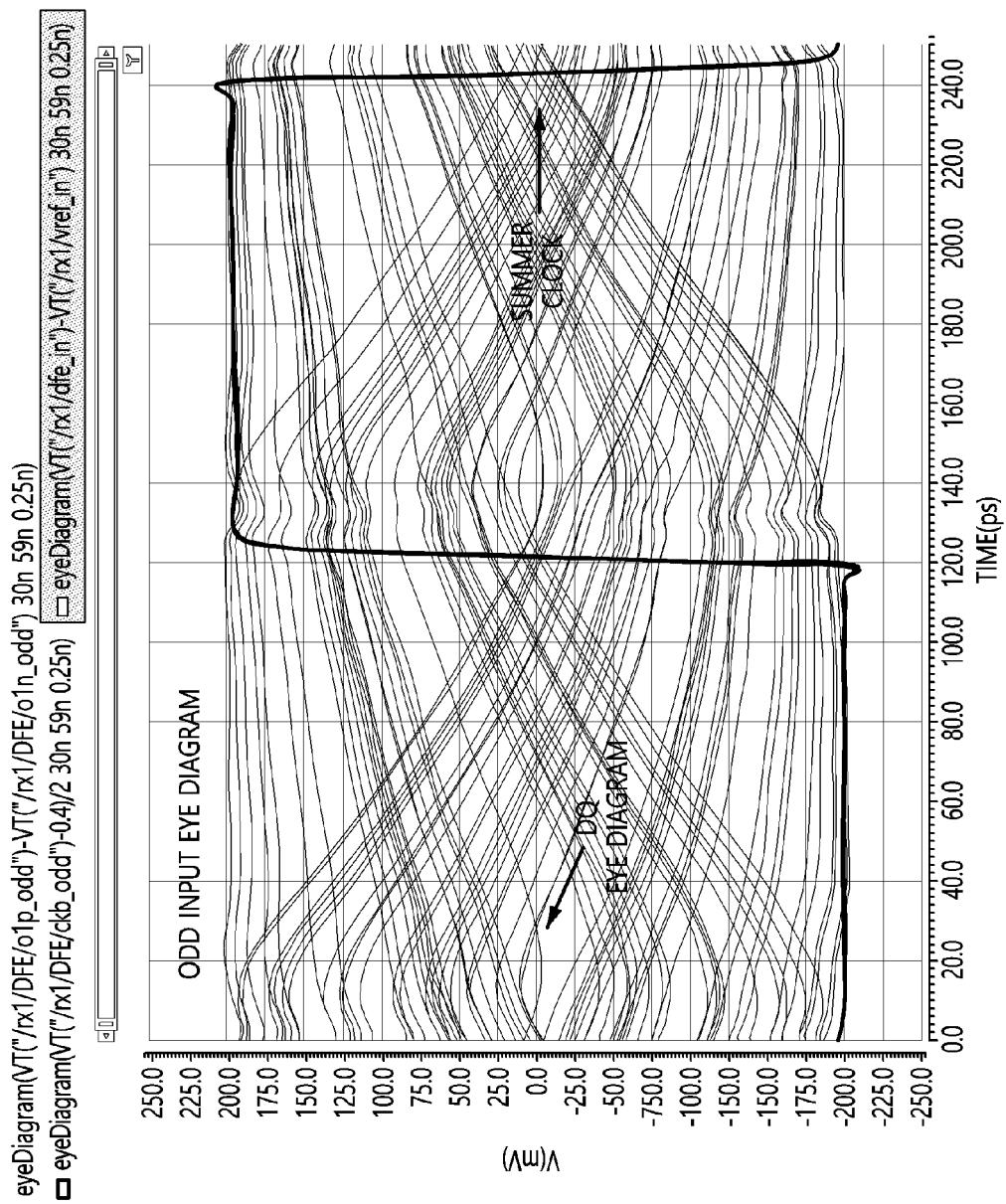

FIG. 8 and FIG. 9 illustrate an input eye diagram of a summer, and it can be seen that the eye of an input DQ signal is rarely open.

Figure 10:
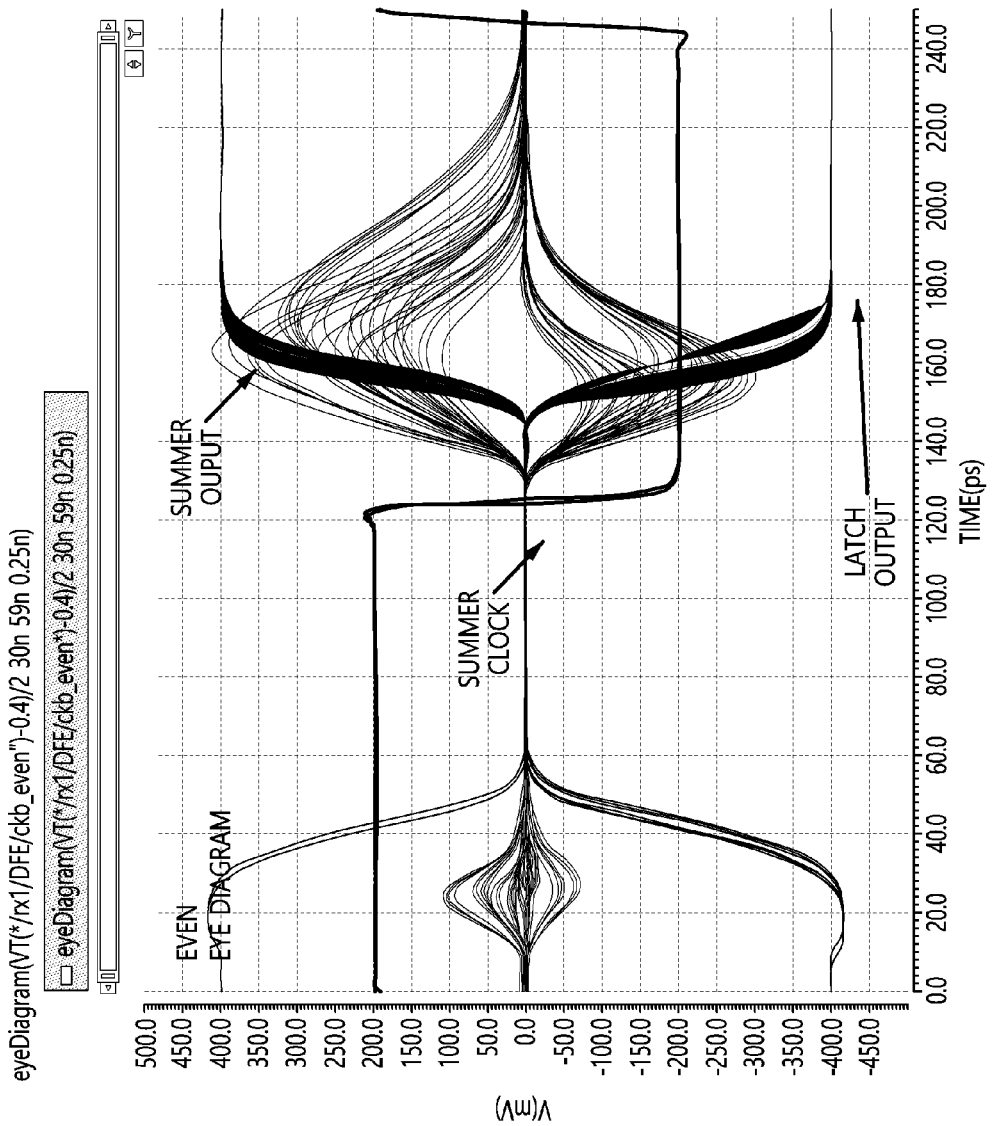
Figure 11:
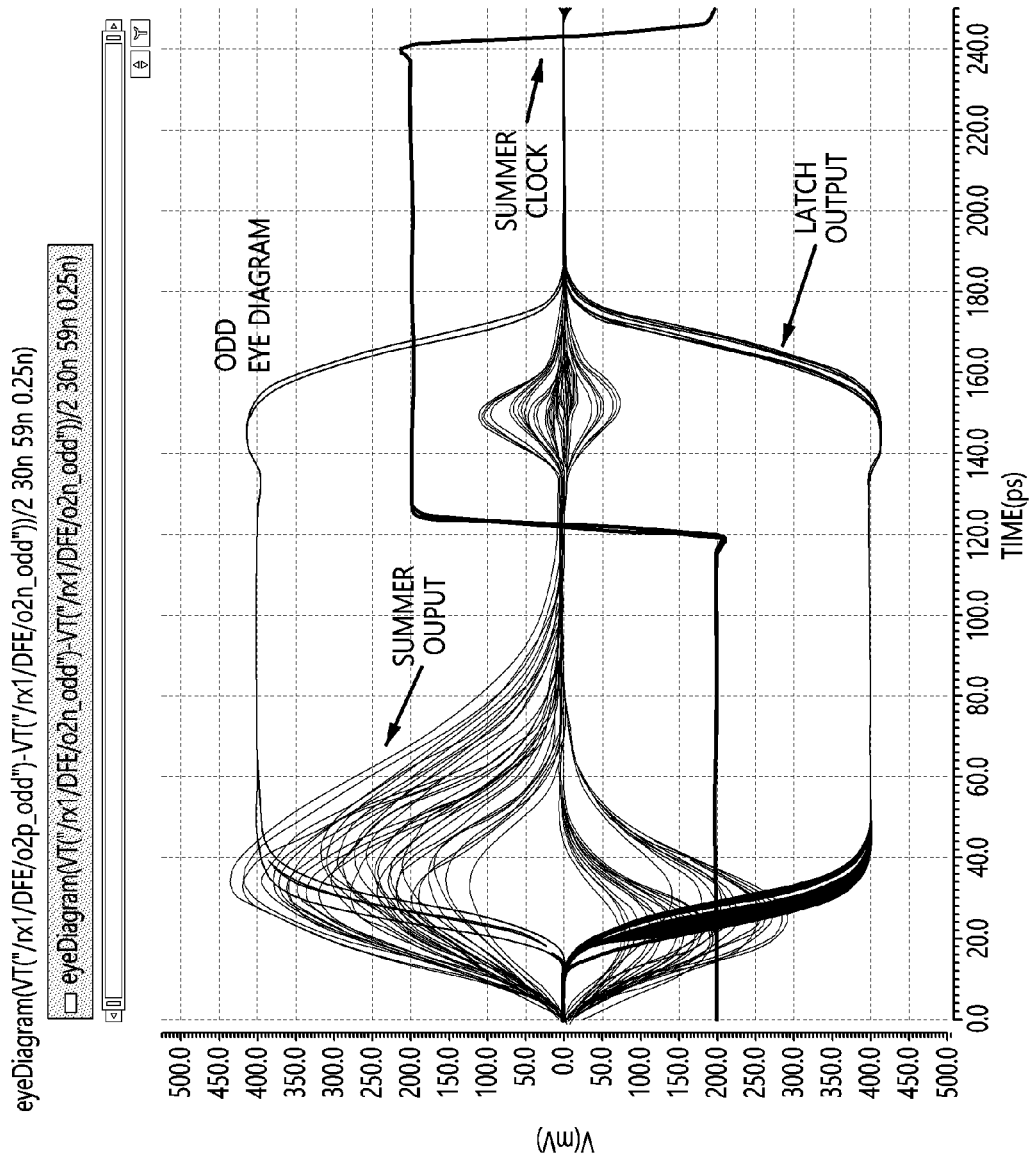

FIG. 10 and FIG. 11 illustrate an output eye diagram of a summer in which a DFE function is included, and an eye opening of about 200 mV is seen in the eye diagram.

Figure 12:
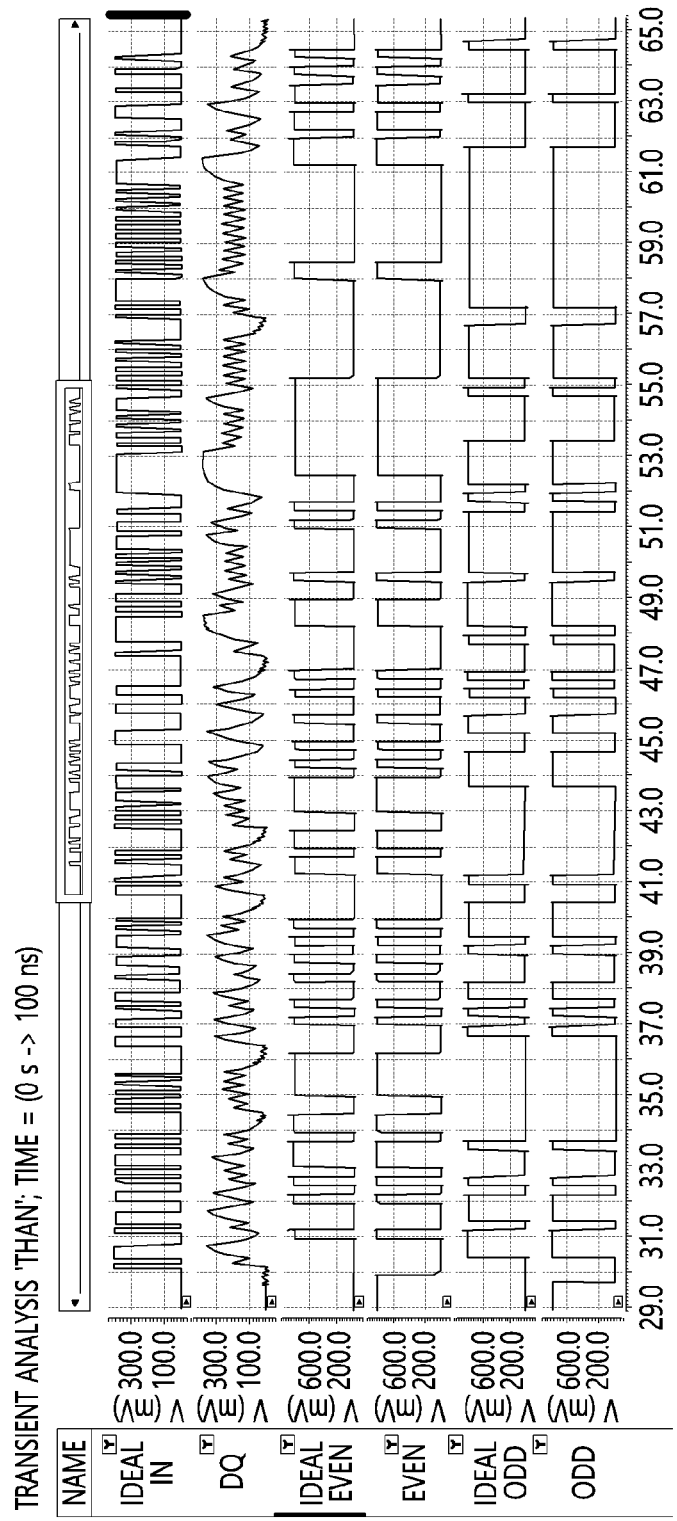

FIG. 12 is a result of checking the waveforms of input DQ and EVEN/ODD outputs on the same time axis, and it can be seen that they have the same waveform shape as reference signals.

FIGS. 13 to 17 are exemplary views of waveforms in a simulation in which a summer according to an embodiment is applied to a differential signal path unit.

Figure 13:
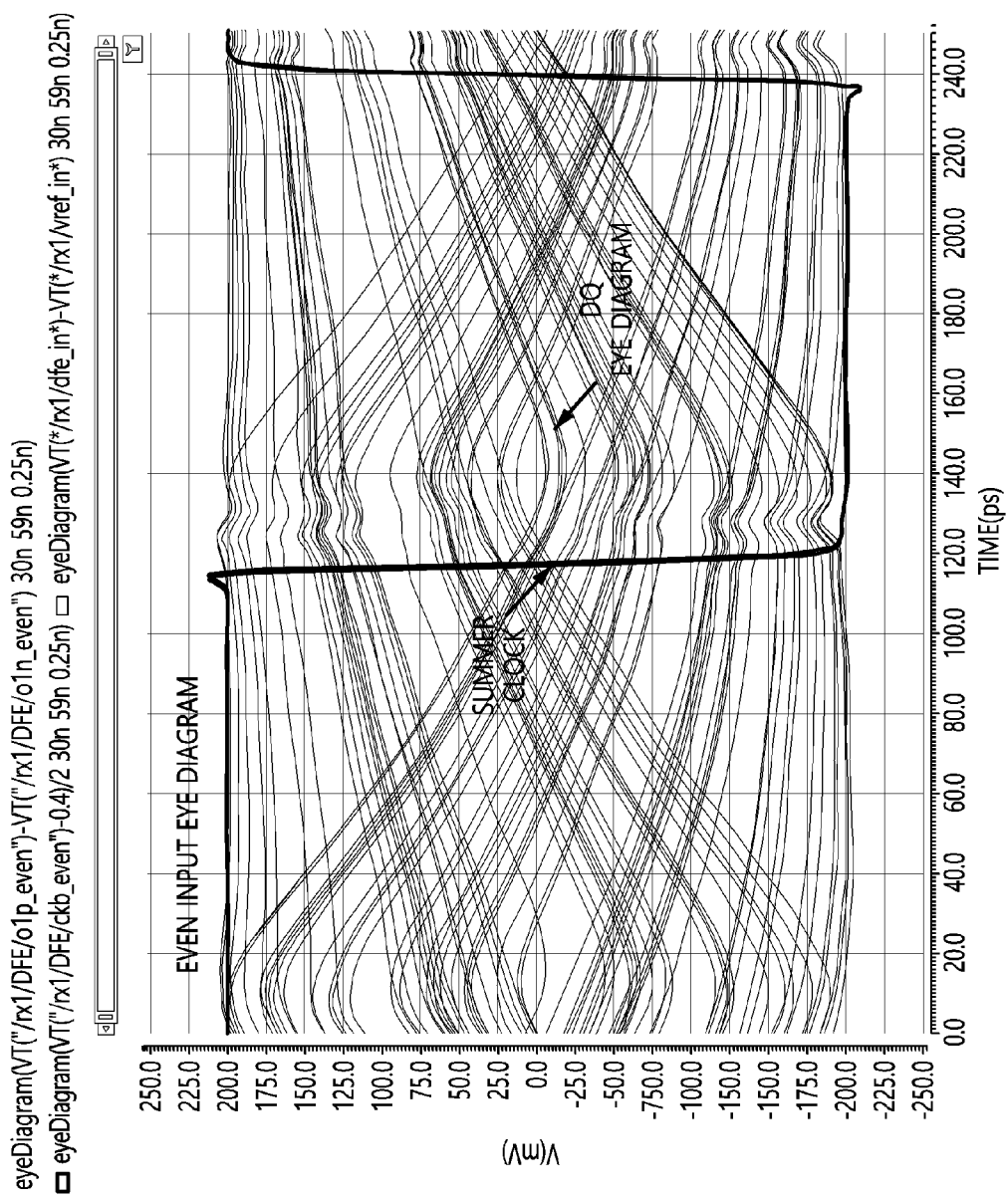
FIGS. 13 to 17 are exemplary views of waveforms in a simulation in which a summer according to an embodiment is applied to a differential signal path unit.
Figure 14:
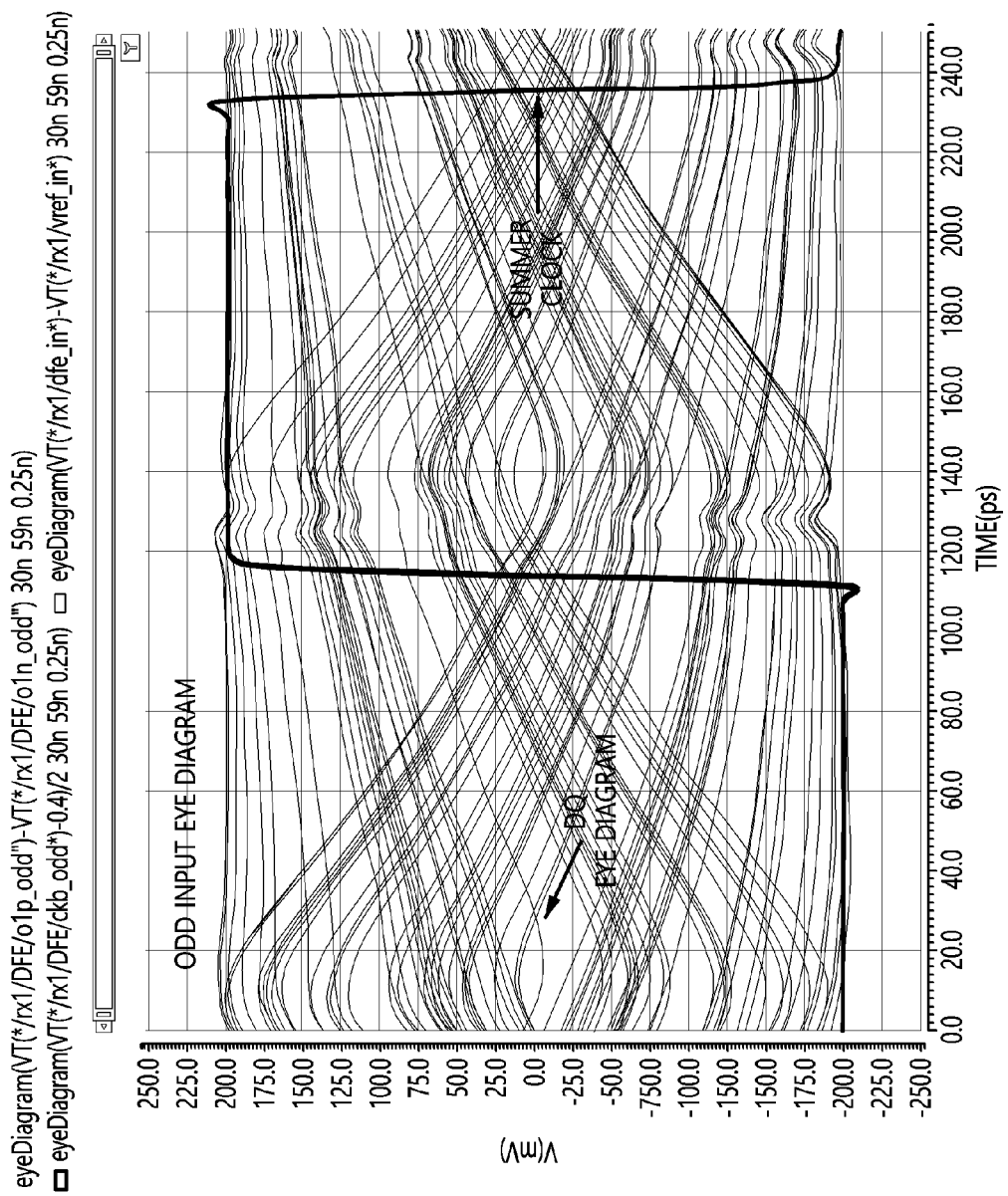

FIG. 13 and FIG. 14 illustrate an input eye diagram of a summer, and it can be seen that the eye of an input DQ signal is rarely open, as in FIG. 8 and FIG. 9.

Figure 15:
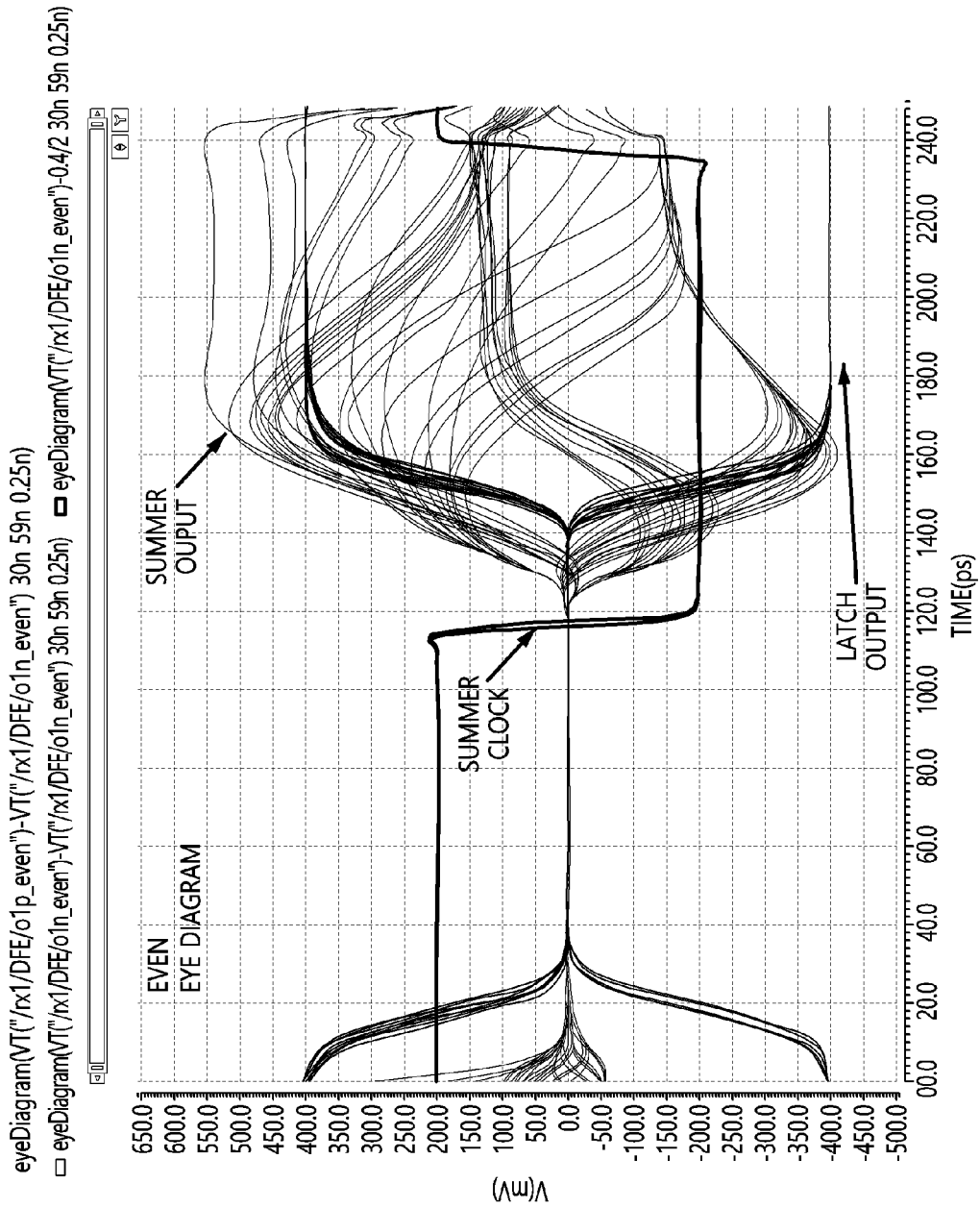
Figure 16:
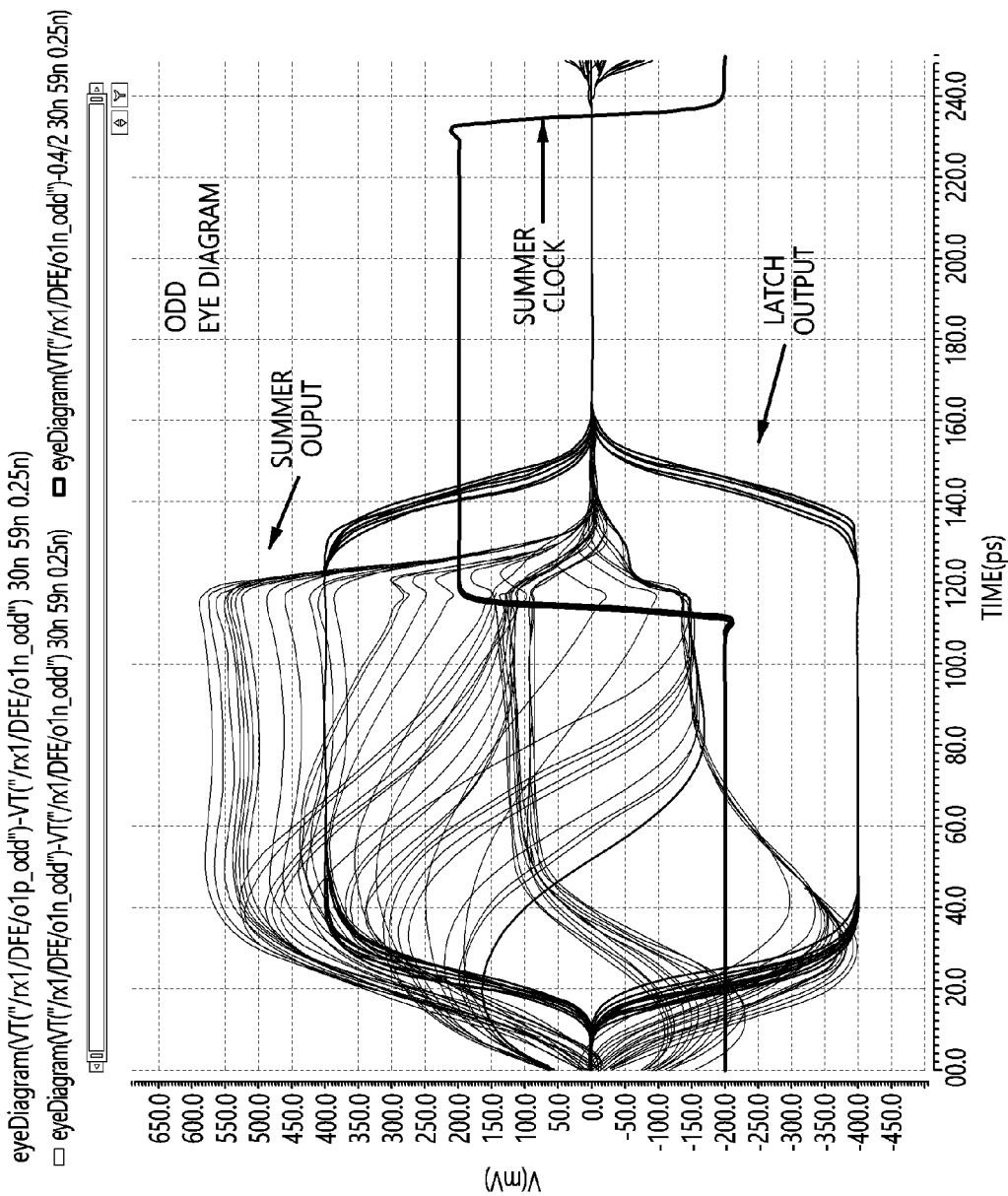

FIG. 15 and FIG. 16 illustrate an output eye diagram of a summer in which a DFE function is included, and it can be seen that the eye of the summer output is open after a summer clock changes to low.

Figure 17:
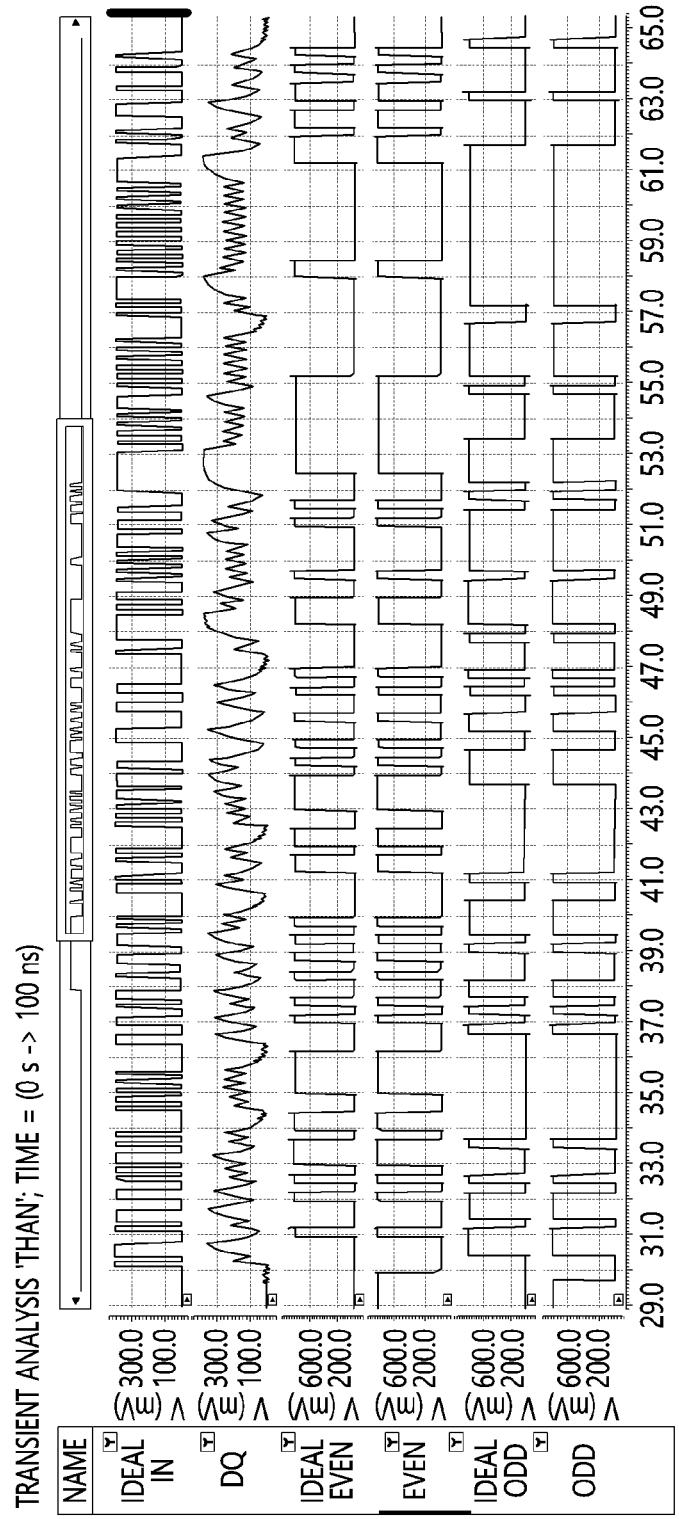

FIG. 17 is a result of checking the waveforms of input DQ and EVEN/ODD outputs on the same time axis, and it can be seen that EVEN/ODD outputs are normal in response to an input signal, as in FIG. 12.

When FIGS. 8 to 12 are compared with FIGS. 13 to 17, it can be seen that there is no difference in performance between the case in which a conventional summer is applied and the case in which the summer according an embodiment is applied. That is, it can be seen that the performance is not degraded although a circuit is simplified according to an embodiment. Therefore, the design area of a chip may be reduced without performance degradation according to an embodiment, and power consumption may be reduced when a data signal is transmitted and received at high speeds.

According to the disclosed embodiment, an area can be minimized while maintaining performance in an interface for receiving data from memory.

According to the disclosed embodiment, power consumption for driving a circuit can be minimized and data transfer efficiency can be improved in a data receiving interface of memory.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for receiving data from memory, which is configured to receive a data signal and a clock signal output from the memory, comprising:
   a Decision Feedback Equalizer (DFE) including two or more differential signal path circuits configured to determine and output an output value corresponding to the data signal,
   wherein:
   each of the two or more differential signal path circuits determines a current output value by reflecting a previous output value fed back from a different one of the two or more differential signal path circuits in such a way that the two or more differential signal path circuits operate at different clocks, and includes an offset control circuit configured to adjust an offset at an input stage including at least one transistor and a feedback control circuit configured to change a load of an output stage using the previous output value fed back from the different one of the two or more differential signal path circuits.

2. The apparatus of claim 1, wherein each of the two or more differential signal path circuits includes
a summer configured to amplify a difference between the data signal and a reference voltage based on the previous output value fed back from the different one of the two or more differential signal path circuits; and
a latch configured to set an output value to '1' or '0' based on the difference between the data signal and a reference signal, which is output from the summer, and to output the output value.

3. The apparatus of claim 2, wherein each of the two or more differential signal path circuits further includes an set-reset (SR) latch configured to hold a signal output from the latch.

4. The apparatus of claim 2, wherein the summer includes
a first transistor configured to receive the data signal;
a second transistor configured to receive the reference voltage;
a first offset control circuit connected to the first transistor and configured to adjust a voltage of the first transistor depending on an applied offset control signal; and
a second offset control circuit connected to the second transistor and configured to adjust a voltage of the second transistor depending on an applied control signal.

5. The apparatus of claim 4, wherein each of the first offset control circuit and the second offset control circuit is a transistor array.

6. The apparatus of claim 4, wherein:
the first offset control circuit includes a third transistor configured to receive the data signal and a fourth transistor connected in series to the third transistor and configured to receive the offset control signal, and
at least one of a pair of the third transistor and the fourth transistor is connected in parallel to the first transistor.

7. The apparatus of claim 4, wherein:
the second offset control circuit includes a fifth transistor configured to receive the reference voltage and a sixth transistor connected in series to the fifth transistor and configured to receive the offset control signal from outside, and
at least one of a pair of the fifth transistor and the sixth transistor is connected in parallel to the second transistor.

8. The apparatus of claim 2, wherein the summer includes the feedback control circuit that is used as the load of the output stage and changed by the previous output value fed back from the different one of the two or more differential signal path circuits.

9. The apparatus of claim 8, wherein:
the feedback control circuit is configured with multiple transistors, and
part of the multiple transistors are selectively turned on depending on an applied DFE control signal, thereby adjusting a magnitude of the previous output value fed back from the different one of the two or more differential signal path circuits.

10. A summer for amplifying and outputting a difference between a data signal and a reference voltage input thereto, comprising:
an offset control circuit configured to adjust an offset at an input stage including a first transistor configured to receive a clock signal, a second transistor configured to receive the data signal, a third transistor configured to receive the reference voltage input, wherein the offset control circuit includes:
a first offset transistor array configured to adjust a voltage of the second transistor using a first pair of series-connected transistors, based on a first offset control signal; and
a second offset transistor array configured to adjust a voltage of the third transistor, based on a second offset control signal; and
a feedback control circuit configured to change a load of an output stage using a digital decision output value corresponding to a previous data signal that is fed back.

11. The summer of claim 10, wherein the first offset transistor array is further configured to adjust the voltage of the second transistor using a first pair of series-connected transistors, based on the data signal and the first offset control signal that are applied to different transistors within the first pair, respectively, and
the second offset transistor array is further configured to adjust the voltage of the third transistor using a second pair of series-connected transistors, based on the reference voltage input and the second offset control signal that are applied to different transistors within the second pair, respectively.

12. The summer of claim 10, wherein:
the first offset transistor array includes a fourth transistor configured to receive the data signal and a fifth transistor connected in series to the fourth transistor and configured to receive the first offset control signal, and
at least one of a pair of the fourth transistor and the fifth transistor is connected in parallel to the second transistor.

13. The summer of claim 10, wherein:
a second offset control circuit includes a sixth transistor configured to receive the reference voltage and a seventh transistor connected in series to the sixth transistor and configured to receive the second offset control signal from outside, and
at least one of a pair of the sixth transistor and the seventh transistor is connected in parallel to the third transistor.

14. The summer of claim 10, wherein:
the feedback control circuit is configured with multiple transistors, and
part of the multiple transistors are selectively turned on depending on an applied Decision Feedback Equalizer (DFE) control signal, thereby adjusting a magnitude of the previous data signal that is fed back.

* * * * *